(12) United States Patent
Chen et al.

(10) Patent No.: US 10,528,404 B2
(45) Date of Patent: Jan. 7, 2020

(54) EVENT LOGGING IN A MULTI-CORE SYSTEM

(71) Applicant: Micron Technology, Inc., Boise, ID (US)

(72) Inventors: Xiangping Chen, San Jose, CA (US); Michael L. Edgington, Fort Collins, CO (US); Steven Gaskill, Campbell, CA (US); Jason Pulinski, East Garrison, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 15/996,319

(22) Filed: Jun. 1, 2018

(65) Prior Publication Data

US 2019/0370088 A1 Dec. 5, 2019

(51) Int. Cl.
*G06F 9/54* (2006.01)
(52) U.S. Cl.
CPC .............. *G06F 9/542* (2013.01); *G06F 9/546* (2013.01)
(58) Field of Classification Search
CPC .............................. G06F 2201/84; G06F 9/542

USPC .......................................... 707/649; 719/318
See application file for complete search history.

(56) References Cited

U.S. PATENT DOCUMENTS

| 8,768,890 B2* | 7/2014 | Burchall | ............. | G06F 11/1471 |
| | | | | 707/649 |
| 2017/0024140 A1* | 1/2017 | Shivanand | .............. | G06F 3/064 |

\* cited by examiner

*Primary Examiner* — Andy Ho
(74) *Attorney, Agent, or Firm* — Nicholson De Vos Webster & Elliott LLP

(57) ABSTRACT

A processing device stores a first log entry in a first log structure that stores log entries regarding occurrences of events for a first core in a computer system composed of a plurality of cores. In response to detecting the occurrence of a log flush trigger event, the processing device copies a plurality of log entries, including the first log entry, from the first log structure as a second log entry in a second log structure that stores log entries for multiple of the plurality of cores. The processing device dynamically determines the size of the second log entry based on the varied sizes of the plurality of log entries. The processing device generates a log entry header for the second log entry, including at least a core identifier identifying the first core associated with the first log structure and prepends the log entry header to the second log entry.

20 Claims, 8 Drawing Sheets

EVENT LOGGING IN A MULTI-CORE SYSTEM

TECHNICAL FIELD

The present disclosure generally relates to logging event messages, and more specifically, relates to event logging in a multi-core system.

BACKGROUND ART

Host systems record messages in a log file to maintain a record of different types of events or occurrences occurring within the system. The messages recorded into the log file can assist developers diagnose and solve problems, as well as debug computer code. Messages can provide general information, as well as warnings or critical information.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
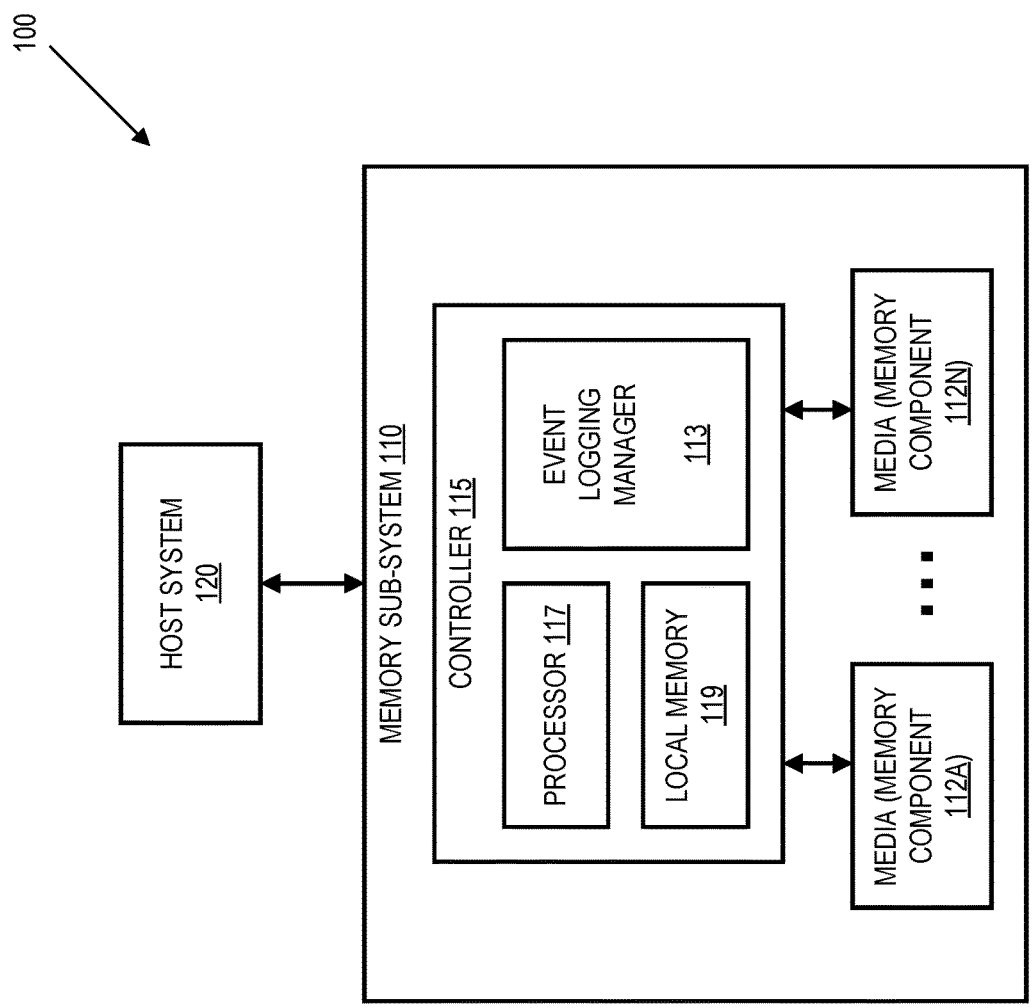
FIG. 1 illustrates an example computing environment that includes a memory sub-system in accordance with some embodiments of the present disclosure.

Aspects of the present disclosure are directed to event logging system in a memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Logging systems store message strings of varying sizes in the log entries themselves, requiring these systems to either allocate space for each message string based on the size of the message or establish fixed-sized fields of a sufficient length to satisfy any request. In addition, logging systems allocate a pre-defined or fixed sized portion of storage, regardless of the sizes of the entries. This can result in wasted resources when the size of log entries or data being copied is less than the space allocated in the fixed sized portions. This inefficiency can represent a significant waste of resources as more of the fixed sized portions are only partially filled.

Aspects of the present disclosure provide efficiencies in the process of generating log entries and in how the log entries are maintained and stored in a hierarchy of log structures. For example, when the processing system receives a request to generate and store a log entry, the processing system generates a compact log entry. The processing system can generate a compact log entry by tokenizing a message string in the message request so that a generated log entry contains a token directing or pointing to the message string in an external data structure (e.g., a string table). This allows for the log entry to store an address in a field in a log entry header that is consistent in size for any length of message versus utilizing a large amount of memory for larger messages.

In one embodiment, the hierarchy of log structures includes local logs, a staging log, and a persistent log. Each local log stores entries for a specific core of multiple cores in a computer system. The staging log stores clusters of log entries from each of the cores in one or more sectors. The persistent log stores the sectors from the staging log in non-volatile memory. The staging log apportions an amount of space for sectors based on the combined sizes of log entries in a log entry cluster. Apportioning space in the staging log dynamically, based on the space needed for a specific log entry cluster provides efficiencies in storage space allocation over systems that provide pre-allocated or fixed-sized storage spaces that can result in wasting storage space due to unused portions. Because space in the persistent log is similarly allocated based on the size of the sectors to be copied from the staging logs, additional efficiencies in storage space allocation are provided.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an event logging manager component 113 that can manage a hierarchy of log structures and how log entries are copied between the hierarchy of log structures. In some embodiments, the controller 115 includes at least a portion of the event logging manager component 113. For example, the controller 115 can include a processor 117 (processing device) configured to execute instructions stored in local memory 119 for performing the operations described herein. In some embodiments, the event logging manager component 113 is part of the host system 110, an application, or an operating system.

The event logging manager component 113 can implement an event logging system in a system with multiple cores. In one embodiment, the event logging manager component 113 is a distributed event logging system with one or more event log manager subcomponents in each of the multiple cores. The event logging manager component 113 can implement an event logging system by generating compact log entries within local logs of individual cores of a multiple core system, aggregating the log entries from the multiple cores into single staging logs, and storing the log entries in persistent logs based on log message types. Further details with regards to the operations of the event logging manager component 113 are described below.

Figure 2:
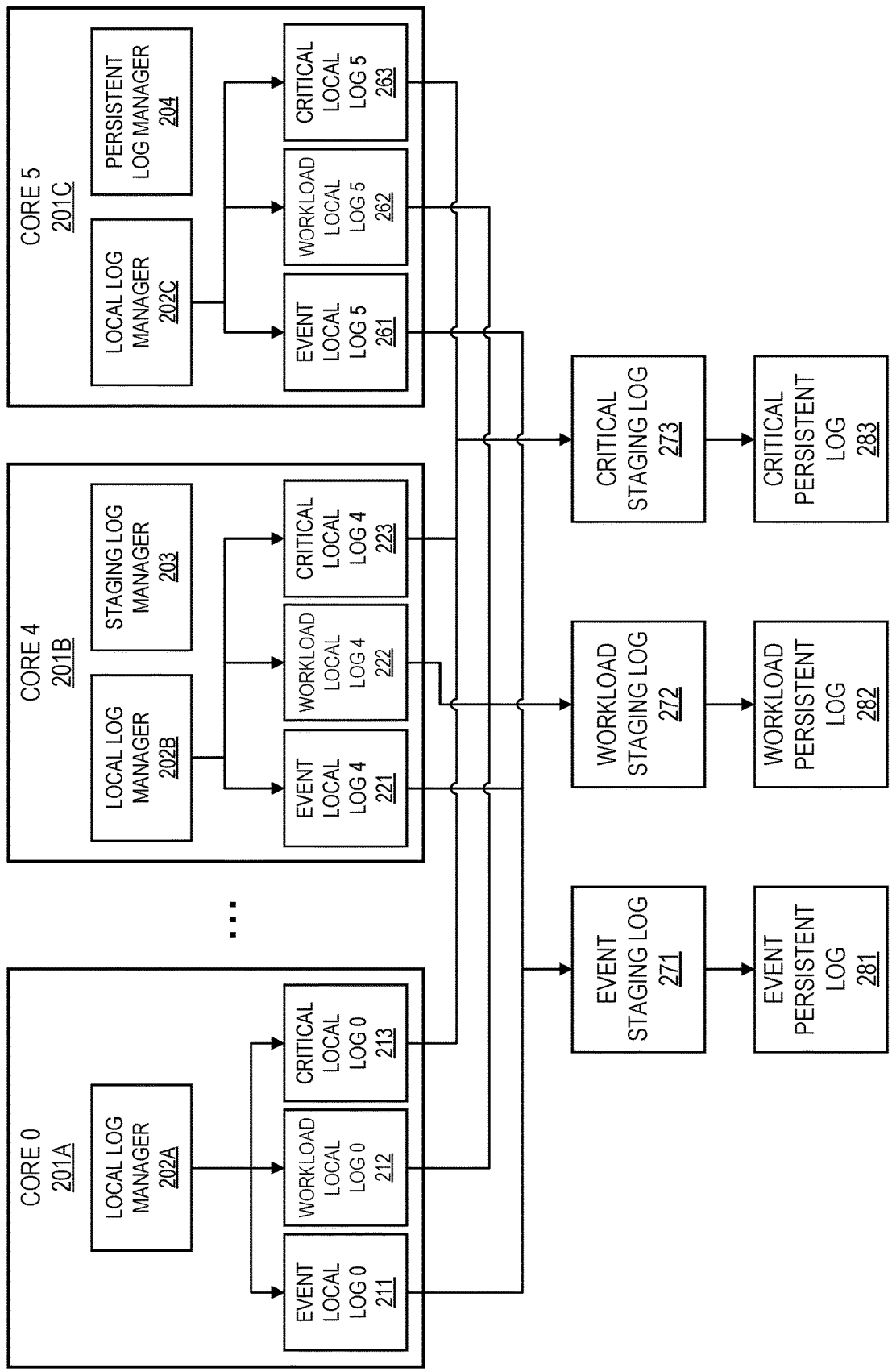
FIG. 2 illustrates log structures in a system having multiple cores, in accordance with some embodiments of the present disclosure.

FIG. 2 illustrates log structures in a system having multiple cores, in accordance with some embodiments of the present disclosure. In the embodiment depicted in FIG. 2, the system includes six cores (e.g., 201A-201C). Other embodiments of the present disclosure can implement systems with a fewer number or a greater number of cores. As depicted in FIG. 2, each core includes a local log manager and a set of local log structures. For example, core 0 201A includes local log manager 202A, event local log 0 211, workload local log 0 212, critical local log 0 213, core 4 201B includes local log manager 202B, event local log 4 221, workload local log 4 222, critical local log 4 223, and core 5 201C includes local log manager 202C, event local log 0 261, workload local log 0 262, critical local log 0 263. In one embodiment, each local log is a DRAM buffer with a size of 8 KB or 16 KB. FIG. 2 further includes a staging log manager 203 and a persistent log manager 204. The staging log manager 203 and the persistent log manager 204 are depicted as being in core 4 201B and core 5 201C, respectively. However, the staging log manager 203 and the persistent log manager 204 can be located on the same core or any one or more of the multiple cores.

Event log messages include informational and debugging messages. In some embodiments, event log messages can include warning and/or error messages. Workload log messages include information about non-volatile memory on memory devices. Examples include NAND-related usage statistics. Critical log messages include less frequent events that are more critical in nature. Examples of critical events include NAND block retirement and the drive case temperature reaching critical threshold.

Each local log manager 202A-C manages the storage of event log entries in the appropriate log structure related to events in the corresponding core. For example, the local log manager 202A stores a critical event log entry related to an event in core 0 201A in critical local log 0 213. Each local log manager 202A-C furthers monitors for the occurrence of one or more log flush trigger events, and can initiate a local log flush, e.g., by sending a request to a staging log manager (e.g., staging log manager 203) or by flushing log entries to the appropriate staging log. In such embodiments, the staging log manager 203 manages at least a portion of a local log flush, e.g., the copying of data from a local log to a staging log.

In one embodiment, the local log manager 202A determines placement of log entries in the appropriate log structure in response to the content of a macro call requesting the log entry. In one embodiment, the format of the macro call to log information is:

MACRO_NAME (Log_String, DWORD0, DWORD1, DWORD2, DWORD3)

In one embodiment, the local log manager 202A uses the macro name to select the log structure for the log entry. Example macro names include: DBG ( ), INFO ( ), WARN ( ), and ERR ( ) for the event log, WORKLOAD ( ) for the workload log, and CRIT ( ) for the critical log. The "Log_String" can contain a string message and printf-style format (or another output format) specifiers or variables. The DWORDs are optional data parameters for placement in the variables of the message string. In one embodiment, log entries contain 0-4 DWORDS of data. In such embodiments, the sizes of individual log entries vary based on the number of parameters (e.g., DWORDS).

In one embodiment, a single set of staging log structures stores log entries for the multiple cores 201-206. For example, FIG. 2 includes event staging log 271, workload staging log 272, and critical staging log 273. In one embodiment, event staging log 271, workload staging log 272, and critical staging log 273 reside on one of the multiple cores (e.g., core 4 201B). In one embodiment, the multiple cores are stored on a memory component (e.g., memory components 112A-N). In another embodiment, staging log manager 203 stores one or more of the staging logs on different cores from one or more other staging logs. In one embodiment, each staging log is a DRAM buffer with a typical size of 64 KB to 128 KB.

In one embodiment, event logging manager 113 implements a staging log manager 203. In one embodiment, staging log manager 203 implements a single staging log for each log type and aggregates the log entries for each log type from the multiple cores into the single staging log for the particular log type. The staging log manager 203 manages portions of a staging log flush, e.g., the copying of data from a staging log to a persistent log. In some embodiments, the staging log manager 203 manages portions of a local log flush, e.g., the copying of data from a local log to a staging log. In one embodiment, the staging log manager 203 receives log entries from the local logs. In another embodiment, the staging log manager 203 copies clusters of log entries from local logs in response to a request for a local flush from local logs.

In one embodiment, a single set of persistent log structures stores log entries for the multiple cores 201-206. For example, FIG. 2 includes event persistent log 281, workload persistent log 282, and critical persistent log 283. In one embodiment, event persistent log 281, workload persistent log 282, and critical persistent log 283 reside on a non-volatile memory component (e.g., memory components 112A-N), such as a NAND. In one embodiment, each persistent log is a large buffer with a typical size of 32 MB to 64 MB.

In one embodiment, event logging manager 113 implements a persistent log manager 204. The persistent log manager 204 copies log entry clusters from staging logs in response to a request from a staging log manager 203 for a staging flush from staging logs, or when the persistent log manager 204 detects a trigger for a staging flush. In one embodiment, persistent log manager 204 implements a single persistent log for each log type and flushes the log entries for each log type from the corresponding staging log into the single persistent log for the particular log type. In one embodiment, persistent log manager 204 stores the persistent logs on one of the cores (e.g., core 5 201C). In another embodiment, persistent log manager 204 stores the persistent logs on different cores. The persistent log manager 204 stores the persistent logs in a non-volatile memory (e.g., NAND).

Figure 3:
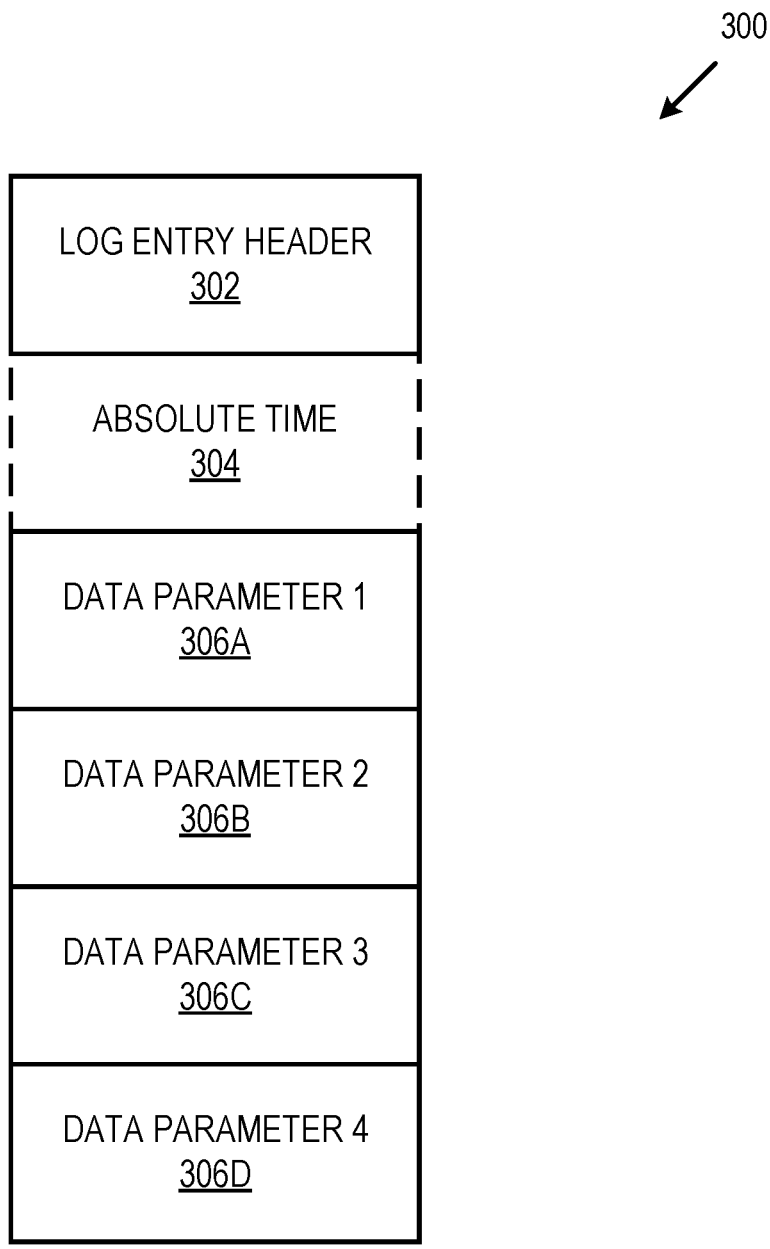
FIG. 3 illustrates a typical format for a log entry, in accordance with some embodiments of the present disclosure.

FIG. 3 illustrates a typical format for a log entry 300, in accordance with some embodiments of the present disclosure. In one embodiment, the log entry 300 includes a log entry header 302, an optional absolute time field 304, and zero to four data parameters (e.g., 306A-306D).

In one embodiment, the log entry header 302 includes a message identifier, a timestamp absolute flag, a timestamp, and the number of data parameters (e.g., DWORDS). In one embodiment, the message identifier is 16 bits, the timestamp is 12 bits, the timestamp absolute flag is 1 bit, and the number of data parameters is 3 bits.

In one embodiment, the local log manager (e.g., local log manager 202A) generates the message identifier by tokenizing a message string in the macro call. In one embodiment, the local log manager copies the message string into location external to the local log. Examples include an external string table, database, or file (e.g. a .csv file). In such embodiments, the message identifier is an address pointing to the location storing the message string. In embodiments utilizing a string table, the string table can include one sub-table for each core.

In one embodiment, the local log manager includes additional metadata in the message identifier. For example, the metadata can include a core identifier and a log level for the log entry.

In one embodiment, the local log manager sets the timestamp absolute flag based on the amount of time since a preceding log entry was entered into the local log. When the amount of time is less than a threshold (e.g., 4096 ms), the local log manager sets the timestamp absolute flag to "0" and the timestamp field includes the amount of time since the preceding log entry was entered. In such situations, the local log manager generates the log entry 300 without the absolute time field 304. When the amount of time is greater than the threshold, the local log manager sets the timestamp absolute flag to "1" and includes the absolute time field 304. In one embodiment, when the timestamp absolute flag is set to "1," the absolute time field 304 includes the absolute time in seconds and the timestamp field in log entry header 302 includes a portion of the absolute time, e.g., the last 0-999 ms of the absolute time.

Based on a log message request, the size of a log entry can range from one to six DWORDs. For example, the elapsed time since the preceding log entry was entered and the number of data parameters in the message request are determinative of the size of the log entry. In the situation where the message contains only a string and less than 4096 ms have passed since the previous log entry, the entire log entry requires only a single DWORD (e.g., the log entry header 302) and can be as small as 4 bytes (e.g., the size of a single DWORD in one embodiment). As shown in FIG. 3, in one embodiment, the maximum size of a log entry can be 6 DWORDS, e.g., a log entry header 302, a DWORD for the absolute time 304, and four data parameters 306A-306D.

In one embodiment, the log structures support binary large object (BLOB) log entries. In one embodiment, BLOB log entries contain greater than 4 DWORDS of data. In one embodiment, the format of the macro call to log a BLOB message is:

MACRO_NAME (Unformatted_Log_String, DWORD_PTR, NUM_DWORDS)

Example macro names include: DBG_BLOB ( ), INFO_BLOB ( ), WARN_BLOB ( ), and ERR_BLOB ( ) for the event log, WORKLOAD_BLOB ( ) for the workload log, and CRIT_BLOB ( ) for the critical log. The "Unformatted_Log_String" can contain a string message. The DWORD_PTR is a pointer to data for the BLOB log entry, and NUM_DWORDS indicates the number of DWORDS for the BLOB log entry. In one example, DWORD_PTR can be an address pointing to a data buffer or a data structure.

Figure 4:
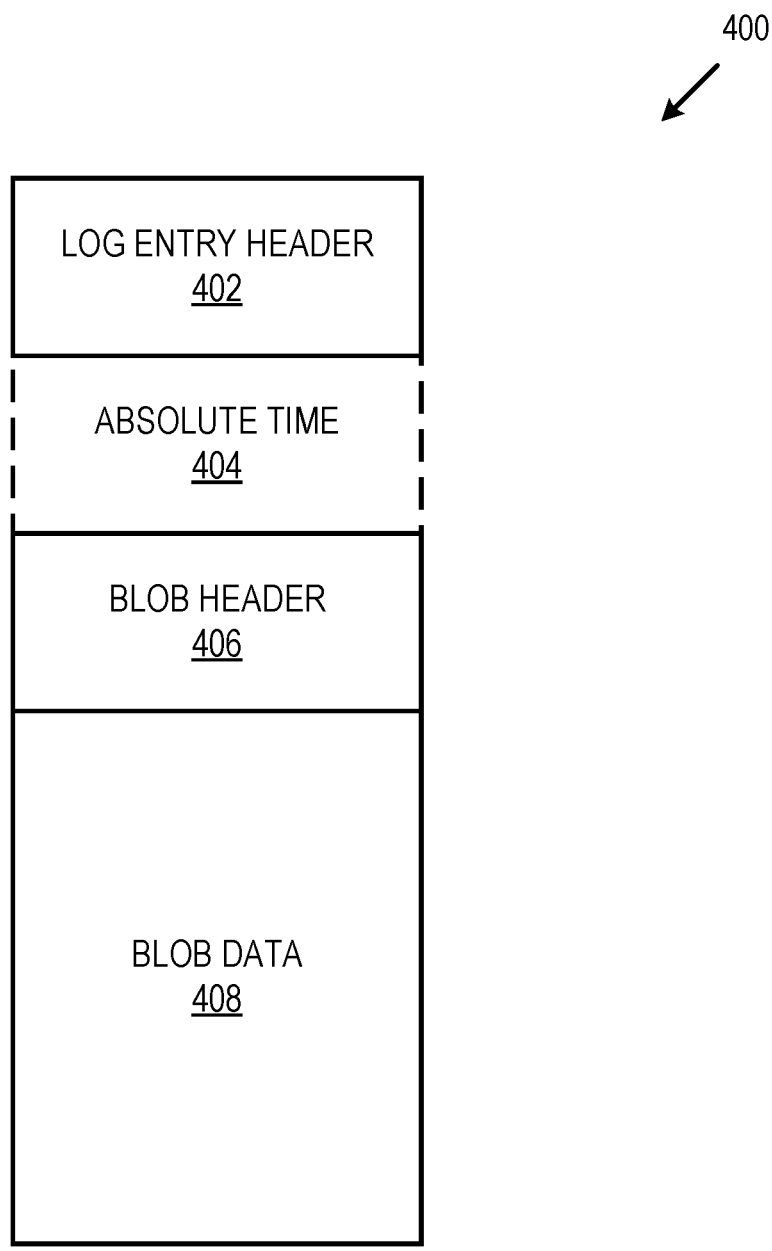
FIG. 4 illustrates a typical format for a binary large object (BLOB) log entry, in accordance with some embodiments of the present disclosure

FIG. 4 illustrates a typical format for a binary large object (BLOB) log entry 400, in accordance with some embodiments of the present disclosure. In one embodiment, the BLOB log entry 400 includes a log entry header 402, an optional absolute time field 404, a BLOB header 406, and BLOB data 408. In one embodiment, the log entry header 402 includes a message identifier, a timestamp absolute flag, a timestamp, and the number of data parameters (e.g., DWORDS). In one embodiment, blob header 406 includes a BLOB header length, a BLOB type, and a BLOB payload length. A local log manager (e.g., local log manager 202A in FIG. 2) generates the message identifier and sets the timestamp absolute flag and timestamp as described above with respect to FIG. D. In one embodiment, the BLOB data 408 can include up to 1 KB of data.

Figure 5:
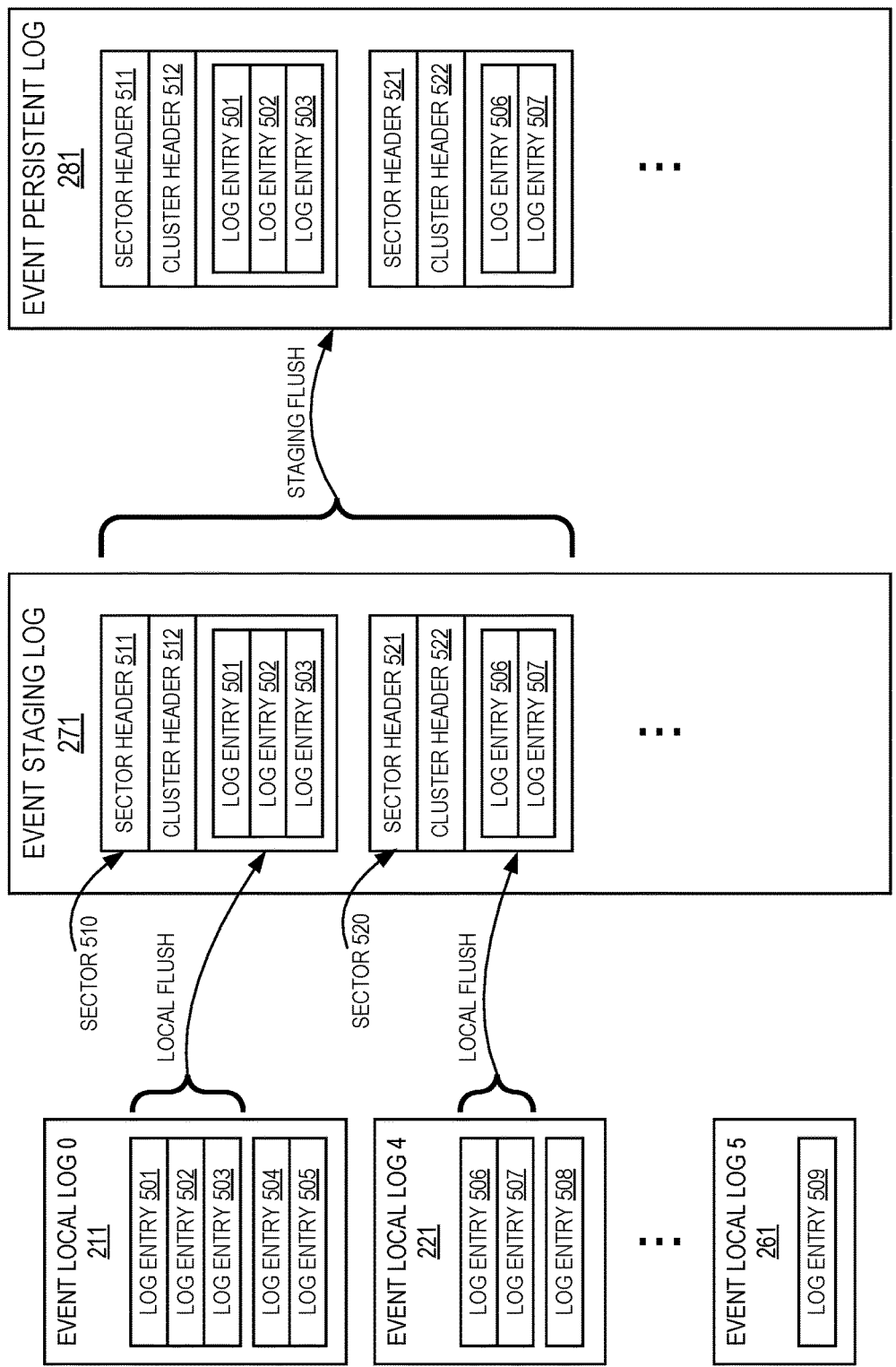
FIG. 5 illustrates a process of flushing log entries between log structures, in accordance with some embodiments of the present disclosure.

FIG. 5 illustrates a process of flushing log entries between log structures, in accordance with some embodiments of the present disclosure. FIG. 5 includes event local log 0 211 containing log entries 501-505, event local log 4 221 containing log entries 506-508, and event local log 5 261 containing log entry 509. Although FIG. 5 is described below with respect to event logs, similar processes can occur in a similar manner in both workload logs and critical logs.

As illustrated in FIG. 5, a local log manager (e.g., local log manager 202A in FIG. 2) managing event local log 0 211 initiates a local flush from event local log 0 211 to event staging log 0 271. In one embodiment, the local log manager 202A monitors for the occurrence of one or more log flush trigger events for event local log 0 211. Examples of log flush trigger events can include a usage amount of storage space on a log reaching a threshold amount (e.g., 50% usage), a request for retrieval of the log, a planned system shutdown or power down, and due to bit-rot (e.g., data stored in the local or staging log for an extended period).

Continuing the example of FIG. 5, in response to determining the occurrence of a log flush trigger event after the local log manager 202A adds log entry 503 to event local log 0 211, the local log manager 202A initiates a local flush of log entries 501-503 to the event staging log 271. In one embodiment, the local log manager 202A designates log entries 501-503 as a log entry cluster. The local log manager 202A also dynamically determines the combined size of the log entries to be flushed (e.g., the size of a log entry cluster composed of C01-503). In one embodiment, the local log manager 202A sends a request to a staging log manager (e.g., staging log manager 203) requesting the staging log manager 203 to begin copying the log entries from the event local log 211 to the event staging log 271. In one embodiment, the staging log manager 203 receives the size of the log entry cluster and apportions an amount of space in event staging log 271 for the log entry cluster. Based on the size of the log entry cluster, the staging log manager 203 allocates a portion or all of at least one sector (e.g., sector 510) and retrieves or receives the log entry cluster.

In one embodiment, in response to determining the occurrence of the log flush trigger event, the local log manager 202A also sets a head pointer to the start of the log entries to be flushed (e.g., log entry 501), and sets a tail pointer to the end of the log entries to be flushed (e.g., log entry 503), to indicate the log entries for the local flush. The local log manager 202A sends the tail pointer, in addition to the memory ranges for the local flush ending at the tail pointer, to the staging log manager 203.

In one embodiment, the local log manager 202A locks the log entries between the head pointer and the tail pointer to prevent any alteration or over-writing of log entries 501-503 while performing the local flush. In one embodiment, the local log manager 202A continues to allow the storage of additional log entries (e.g., log entries 504-505) while performing the local flush of log entries 501-503. As the local log manager 202A adds the additional log entries, local log manager 202A updates the tail pointer.

The local log manager 202A generates a cluster header 512 for the log entry cluster containing log entries 501-503, and prepends the cluster header 512 to the log entry cluster. In one embodiment, the cluster header 512 includes a CPU ID (e.g., indicating the core associated the local log 211 storing with the log entries), CRC, buffer length, and timestamp of the local flush operation.

In one embodiment, the local log manager 202A determines the largest-sized log entry that the local log manager 202A can expect to receive a request for storage, and designates the last portion of the buffer of a local log to the determined size, e.g., a guard band. In one embodiment, when the local log manager 202A receives a request for storage of a log entry, the local log manager 202A determines whether storage of the requested log entry will cross into the guard band portion of the local log. In one embodiment, when the requested log entry crosses into the guard band, the local log manager 202A can either initiate a local flush and/or discard any subsequent log entries until there is additional space within the local log for writing log entries. By operating in this manner, the local log manager 202A prevents partial log entries from being stored in the local log In one embodiment, the cluster header 512 also includes a discard count indicating the number of log entries that, e.g., could not be added to event local log 0 211 because the local log was full. In one embodiment, the local log manager 202A increases the size of the local log buffer and/or reduces a local log flush threshold in response to the discard count being a non-zero value. The staging log manager 203 can perform similar tuning with respect to the event staging log 271.

In one embodiment, the staging log manager 203 generates a sector header for each sector (e.g., 510 and 520) in event staging log 271. In one embodiment, each sector in event staging log 271 is 4 KB in size. In other embodiments, each sector in event staging log 271 is greater or smaller than 4 KB in size. In one embodiment, a single log entry cluster can be larger than the maximum size of a sector in the event staging log 271. In such embodiments, a single log entry cluster can span multiple sectors in event staging log 271. Thus, each sector in event staging log 271 can include one or more complete log entry clusters and a partial log entry cluster. In one embodiment, the sector header 511 includes a version field indicating the version of the format of the sector header, a sector length field indicating the number of valid DWORDS in the sector, a log cluster offset field indicating the DWORD offset of the first log cluster header in the sector, a timestamp, and/or a sequence ID indicating the ordered number of the sector amongst the total number of sectors in the specific log.

In one embodiment, after completion of the local flush (e.g., after receiving a local flush completion message from staging log manager 203), the local log manager 202A unlocks the log entries flushed to the event staging log 271, and sets the head pointer to the previous location of the tail pointer (e.g., to the location of the first log entry in the event local log 0 211 not copied to the event staging log 271 in the local flush). In one embodiment, the flush completion message from staging log manager 203 includes the new head pointer. As a result, the local log manager 202A enables the portion of the local log storing the flushed log entries to be overwritten.

In one embodiment, the local log manager 202B managing event local log 4 221 performs a local flush of log entries 506-507 to event staging log 271 as a log entry cluster with cluster header 522, in the similar manner as described above. In one embodiment, the local log manager 202B performs a single local flush at any given time, and pending local flushes are placed in a queue and are pulled from the queue when the event logging manager 113 completes a current local flush.

In the example depicted in FIG. 5, staging log manager 203 stores the log entry cluster from event local log 4 221 in sector 520 and the log entry cluster from event local log 0 211 in sector 510 event staging log 271. In one embodiment, staging log manager 203 stores the log entry cluster from event local log 4 221 in a different sector when the log entries from event local log 0 211 utilizes all the storage space allocated to a sector (e.g., 4 KB). However, assuming the log entries from event local log 0 211 do not utilize all the storage space allocated to the sector, e.g., sector 510 has additional free storage space, staging log manager 203 can store a portion of or the entire log entry cluster from event local log 4 221 in sector 510. Assuming staging log manager 203 stores a portion of the log entry cluster from event local log 4 221 in sector 510, staging log manager 203 stores cluster header 522 and a first portion of log entries 506-507 in sector 510. In such a scenario, staging log manager 203 stores the remaining portion of log entries 506-507 in sector 520 following sector header 521 and without a cluster header 522. As the sectors are sequentially identified, staging log manager 203 can use the buffer length field in cluster header 522 to determine the end of log entry cluster from event local log 4 221 even when the log entry cluster is split between multiple sectors.

In one embodiment, in response to determining the occurrence of a log flush trigger event, a staging log manager initiates a staging flush from staging logs in volatile memory (e.g., DRAM) to persistent logs in non-volatile memory (e.g., NAND). Continuing the example of FIG. 5, the staging log manager 203 initiates a staging flush of sectors containing log entries 501-503 and 506-507 to the event persistent log 281. In one embodiment, the staging log manager 203 sends a request to a persistent log manager (e.g., persistent log manager 204) requesting the persistent log manager 204 to begin copying designated sectors containing log entry clusters from the event staging log 271. In one embodiment, the persistent log manager dynamically allocates an amount of space in the event persistent log 281 at least equal to the size of the flushed sectors.

In one embodiment, the persistent log manager 204 copies the designated sectors to the event persistent log 281 without modifying the sectors. In one embodiment, the staging log manager 203 finalizes fields in the sector header(s) for the corresponding sectors being flushed to the event persistent log 281. In one embodiment, persistent log manager 204 finalizes fields in the sector header(s) for the corresponding sectors being flushed to the event persistent log 281. In one embodiment, the staging log manager 203 finalizes fields for a sequence identifier, a buffer length, and a timestamp of the staging log flush operation. The sequence identifier is a unique, incrementing 64-bit ID, for identifying an order of log sectors that is assigned to sector when it is flushed to a persistent log. In one embodiment, the event logging manager 113 performs a single staging flush at any given time, and pending staging flushes are placed in a queue and are pulled from the queue when the event logging manager 113 completes a current staging flush.

Figure 6:
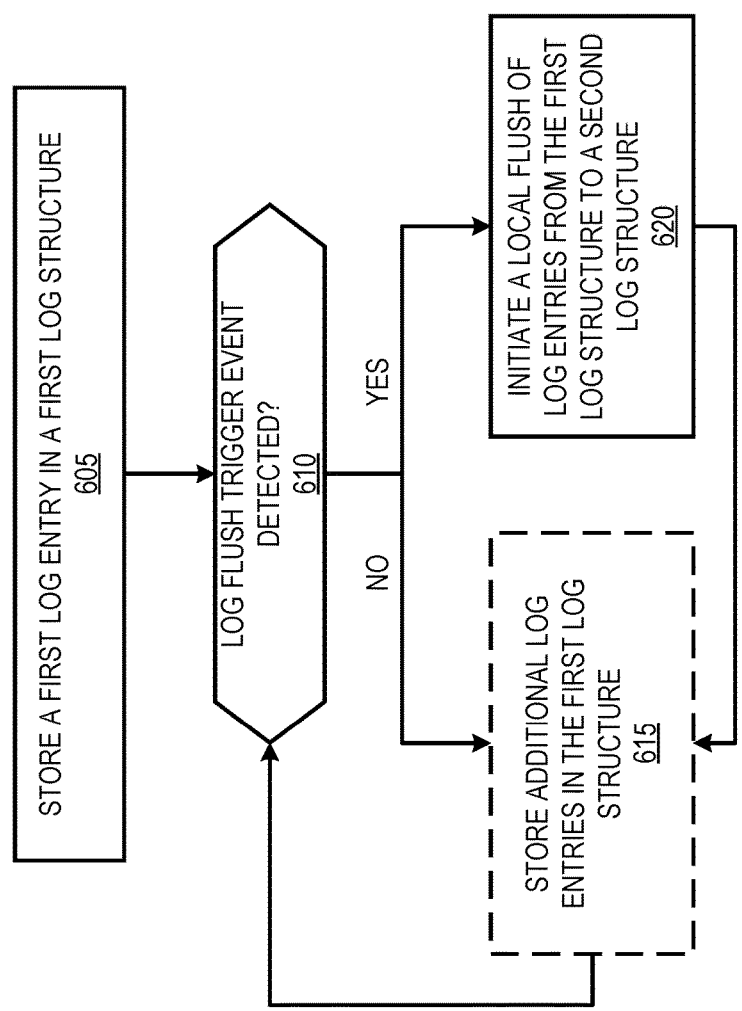
FIG. 6 is a flow diagram of an example method to manage an event logging system in a computer in accordance with some embodiments of the present disclosure.

FIG. 6 is a flow diagram of an example method to manage an event logging system in a computer in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the event logging manager component 113 of FIG. 1 or one or more subcomponents of event logging manager component 113 (e.g., a local log manager and/or a staging log manager). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 605, the processing device stores a first log entry in a first log structure. In one embodiment, the processing device receives a request in the form of a macro call. The macro call can include a type of log message, e.g., "WARN ( )," "INFO ( )," "WORKLOAD ( )," "CRIT ( )," etc. and the processing device selects the appropriate log (e.g., event local log, workload local log, or critical local log) for placement of the log entry based on the type of log message. As described above, the request can include a string message and a set of parameters. The processing device generates a log entry header for the log entry and prepends the log entry header to the data parameters. In one embodiment, the log entry header includes a message identifier, a timestamp absolute flag, a timestamp, and the number of data parameters (e.g., DWORDS).

At block 610, the processing device monitors for a log flush trigger event in the first log structure. Examples of log flush trigger events include, but are not limited to, usage of storage space on the first log structure reaching a threshold amount (e.g., 50% usage), receiving a request for retrieval of or access to the first log structure (or another log structure associated with the first log structure), a planned system shutdown or power down, and due to bit-rot (e.g., data stored in the first log structure for an extended period). When the processing device does not detect the occurrence of a log flush trigger event, the flow proceeds to block 615. When the processing device detects the occurrence of a log flush trigger event, the flow proceeds to block 620.

At block 615, the processing device optionally monitors for and stores additional log entries in the first data structure. In response to receiving additional requests to add log entries to the first log structure, the processing device stores the additional log entries in the first log structure and returns to block 610 to monitor for a log flush trigger event.

At block 620, the processing device initiates a local flush of log entries from the first log structure to a second log structure. In one embodiment, a local log manager managing the first log structure sends a request to a staging log manager managing the second log structure requesting the staging log manager begin copying a designated set of log entries (e.g., a log entry cluster) from the first log structure. In another embodiment, the local log manager sends a message to the staging log manager to receive a log entry cluster sent by the local log manager. In one embodiment, the processing device locks the designated set of log entries while the second log structure copies the log entries.

In one embodiment, the processing device continues to store additional log entries in the first log structure after initiating the local flush of log entries. In such embodiments, while the processing device locks the log entries while performing the local flush to the second log structure, the local log manager adds additional log entries to the first log structure after or in another location than the locked log entries.

Figure 7:
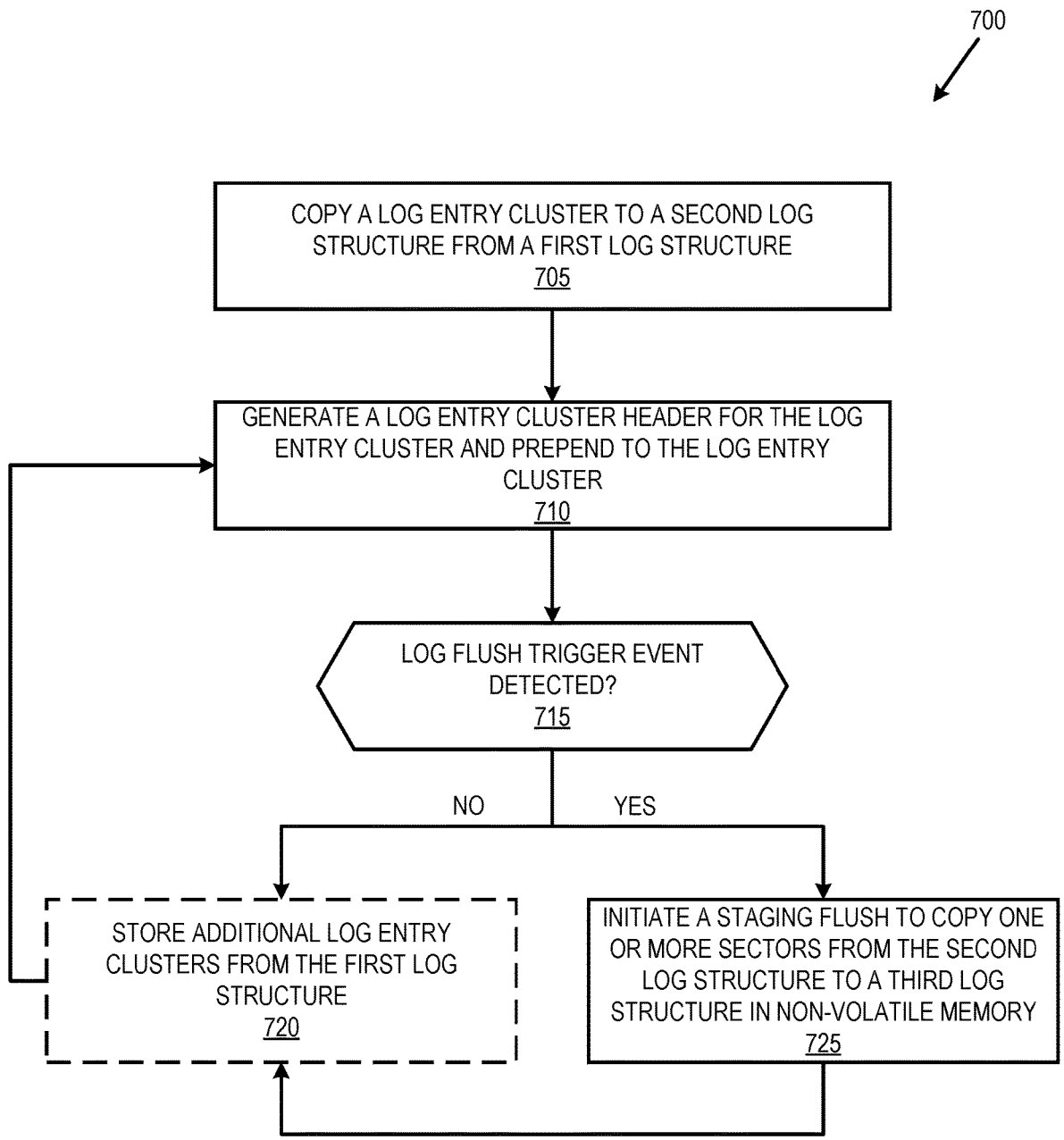
FIG. 7 is a flow diagram of an example method to further manage an event logging system in a computer in accordance with some embodiments of the present disclosure.

FIG. 7 is a flow diagram of an example method to manage an event logging system in a computer in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 700 is performed by the event logging manager component 113 of FIG. 1 or one or more subcomponents of event logging manager component 113 (e.g., a staging log manager and/or a persistent log manager). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 705, the processing device copies a log entry cluster to a second log structure from a first log structure. In one embodiment, the log entry cluster includes one or more log entries stored in the first log structure. In one embodiment, the processing device copies the log entry cluster to the second log structure in response to receiving a request from a local log manager managing the first log structure to perform a local flush of log entries, e.g., as described with reference to FIG. 6, or in response to the local log manager sending log entries to the second log structure.

At block 710, the processing device generates a log entry cluster header for the log entry cluster and prepends the log entry header to the log entry cluster. In one embodiment, the log entry cluster header includes a CPU ID indicating a core storing the local log from which the log entries are being flushed. The processing device can also include one or more of: a buffer length, a timestamp of the local flush operation, and a discard count in the log entry cluster header.

At block 715, the processing device monitors for a log flush trigger event in the second log structure. Examples of log flush trigger events include, but are not limited to, usage of storage space on the second log structure reaching a threshold amount (e.g., 50% usage), receiving a request for retrieval of or access to the second log structure (or another log structure associated with the second log structure), a planned system shutdown or power down, and due to bit-rot (e.g., data stored in the second log structure for an extended period). When the processing device does not detect the occurrence of a log flush trigger event, the flow proceeds to block 620. When the processing device detects the occurrence of a log flush trigger event, the flow proceeds to block 625.

At block 720, the processing device optionally monitors for and stores additional log entry clusters from the first log structure in the second log structure. The processing device monitors for additional local flushes of log entry clusters from the first log structure(s) and returns to block 710 to generate a log entry cluster header for the log entry cluster and monitors for a log flush trigger event. In one embodiment, even when the processing device does not receive additional log entries, the processing device returns to block 715 to continue monitor for a log flush trigger event associated with the second log structure.

At block 725, the processing device copies one or more sectors from the second log structure to a third log structure. In one embodiment, the processing device stores the third log structure in non-volatile memory (e.g., NAND). In one embodiment, the processing device copies the sectors to the third log structure without altering the sectors. In one embodiment, the staging log manager 203, or alternatively, the persistent log manager 204, finalizes fields in the sector header(s) for the corresponding sectors being flushed to the third log structure. In one embodiment, the staging log manager 203 or the persistent log manager 204 finalizes fields for a sequence identifier, buffer length, and a timestamp of the staging log flush operation.

In one embodiment, the processing device continues to store additional log entry clusters in the second log structure after initiating the staging flush of log entries to the third log structure. In such embodiments, while the processing device locks the log entries while performing the staging flush to the third log structure, the staging log manager 203 adds the additional log entry clusters to the second log structure after or in another location than the locked log entry clusters.

Figure 8:
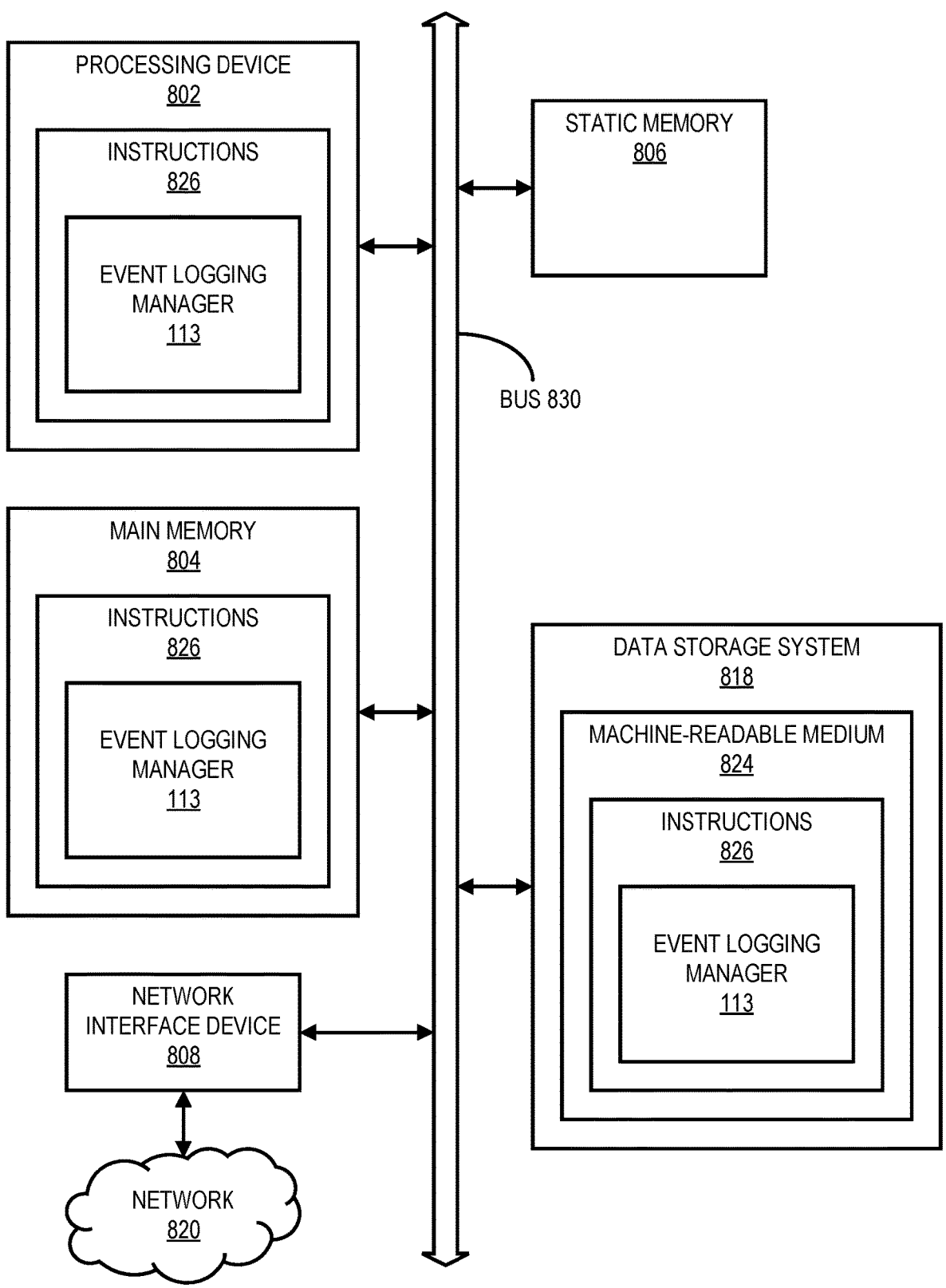
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the event logging manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to an event logging manager component (e.g., the event logging manager component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods 600 and 700 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   storing a first log entry in a first log structure, the first log structure storing log entries regarding occurrences of events for a first core in a computer system composed of a plurality of cores, the first log entry varying in size from one or more other log entries of the first log structure;
   monitoring for a log flush trigger event for the first log structure;
   in response to detecting the log flush trigger event for the first log structure, copying a plurality of log entries from the first log structure to a second log structure as a second log entry, the plurality of log entries including the first log entry, the size of the second log entry dynamically determined based on the varied sizes of the plurality of log entries, and the second log structure storing log entries for multiple of the plurality of cores;
   generating a log entry header for the second log entry, the log entry header including at least a core identifier identifying the first core associated with the first log structure; and
   prepending the log entry header to the second log entry.

2. The method of claim 1, wherein the first log structure and the second log structure are associated with a first log type.

3. The method of claim 1, further comprising receiving a message, wherein storing the first log entry in the first log structure comprises:
   tokenizing the received message to generate a message identifier, the message identifier providing a mapping to a location storing the received message, the location external to the first log structure;
   generating a first log entry header for the first log entry, the first log entry header including the message identifier; and
   generating the first log entry by prepending the first log entry header to data parameters associated with the received message.

4. The method of claim 3, wherein the message identifier is an address of the location external to the first log structure storing the received message.

5. The method of claim 1, further comprising receiving a message, wherein storing the first log entry in the first log structure comprises:
   determining an elapsed time since a previous log entry;
   in response to the elapsed time since the previous log entry being below a threshold value, setting a timestamp flag value, the timestamp flag value indicating a type of timestamp;
   generating a timestamp based on the value of the timestamp flag;
   generating a first log entry header for the first log entry, the first log entry header including the timestamp flag value and the timestamp; and
   generating the first log entry by prepending the first log entry header to data parameters associated with the received message.

6. The method of claim 5, wherein when the elapsed time since the previous log entry is not below the threshold value, the timestamp is an absolute time for a storage device storing the first log structure, and the method further comprises:
   inserting a portion of the absolute time as an additional data parameter within the first log entry separate from the first log entry header.

7. The method of claim 1, further comprising:
   monitoring for a log flush trigger event for the second log structure;
   in response to detecting the log flush trigger event for the second log structure, copying one or more log entries from the second log structure to a third log structure, the one or more log entries including the second log entry, the third log structure stored in non-volatile memory.

8. The method of claim 5, wherein the varied sizes of the plurality of log entries is based on the timestamp flag value and a number of data parameters.

9. A non-transitory computer-readable medium storing instructions, which when executed by a processing device, cause the processing device to:
   store a first log entry in a first log structure, the first log structure storing log entries regarding occurrences of events for a first core in a computer system composed of a plurality of cores, the first log entry varying in size from one or more other log entries of the first log structure;
   monitor for a log flush trigger event for the first log structure;
   in response to detecting the log flush trigger event for the first log structure, copy a plurality of log entries from the first log structure to a second log structure as a second log entry, the plurality of log entries including the first log entry, the size of the second log entry dynamically determined based on the varied sizes of the plurality of log entries, and the second log structure storing log entries for multiple of the plurality of cores;

generate a log entry header for the second log entry, the log entry header including at least a core identifier identifying the first core associated with the first log structure; and prepend the log entry header to the second log entry.

10. The non-transitory computer-readable medium of claim 9, wherein the first log structure and the second log structure are associated with a first log type.

11. The non-transitory computer-readable medium of claim 9, further comprising receiving a message, wherein storing the first log entry in the first log structure further causes the processing device to:

tokenize the received message to generate a message identifier, the message identifier providing a mapping to a location storing the received message, the location external to the first log structure;

generate a first log entry header for the first log entry, the first log entry header including the message identifier; and generate the first log entry by prepending the first log entry header to data parameters associated with the received message.

12. The non-transitory computer-readable medium of claim 11, wherein the message identifier is an address of the location external to the first log structure storing the received message.

13. The non-transitory computer-readable medium of claim 9, further comprising receiving a message, wherein storing the first log entry in the first log structure further causes the processing device to:

determine an elapsed time since a previous log entry;

in response to the elapsed time since the previous log entry being below a threshold value, set a timestamp flag value, the timestamp flag value indicating a type of timestamp;

generate a timestamp based on the value of the timestamp flag;

generate a first log entry header for the first log entry, the first log entry header including the timestamp flag value and the timestamp; and generate the first log entry by prepending the first log entry header to data parameters associated with the received message.

14. The non-transitory computer-readable medium of claim 13, wherein when the elapsed time since the previous log entry is not below the threshold value, the timestamp is an absolute time for a storage device storing the first log structure, and the instructions further cause the processing device to:

insert a portion of the absolute time as an additional data parameter within the first log entry separate from the first log entry header.

15. The non-transitory computer-readable medium of claim 9, wherein the instructions further cause the processing device to:

monitor for a log flush trigger event for the second log structure;

in response to detecting the log flush trigger event for the second log structure, copy one or more log entries from the second log structure to a third log structure, the one or more log entries including the second log entry, the third log structure stored in non-volatile memory.

16. The non-transitory computer-readable medium of claim 13, wherein the varied sizes of the plurality of log entries is based on the timestamp flag value and a number of data parameters.

17. A system comprising:

a memory component; and a processing device, coupled to the memory component, configured to:

store a first log entry in a first log structure, the first log structure storing log entries regarding occurrences of events for a first core in a computer system composed of a plurality of cores, the first log entry varying in size from one or more other log entries of the first log structure;

monitor for a log flush trigger event for the first log structure;

in response to detecting the log flush trigger event for the first log structure, copy a plurality of log entries from the first log structure to a second log structure as a second log entry, the plurality of log entries including the first log entry, the size of the second log entry dynamically determined based on the varied sizes of the plurality of log entries, and the second log structure storing log entries for multiple of the plurality of cores;

generate a log entry header for the second log entry, the log entry header including at least a core identifier identifying the first core associated with the first log structure;

prepend the log entry header to the second log entry;

monitor for a log flush trigger event for the second log structure; and in response to detecting the log flush trigger event for the second log structure, copy one or more log entries from the second log structure to a third log structure, the one or more log entries including the second log entry, the third log structure stored in the memory component.

18. The system of claim 17, wherein the processing device is further configured to receive a message, and wherein storing the first log entry in the first log structure comprises:

tokenize the received message to generate a message identifier, the message identifier providing a mapping to a location storing the received message, the location external to the first log structure;

generate a first log entry header for the first log entry, the first log entry header including the message identifier; and generate the first log entry by prepending the first log entry header to data parameters associated with the received message.

19. The system of claim 17, wherein the processing device is further configured to receive a message, wherein storing the first log entry in the first log structure comprises:

determine an elapsed time since a previous log entry;

in response to the elapsed time since the previous log entry being below a threshold value, set a timestamp flag value, the timestamp flag value indicating a type of timestamp;

generate a timestamp based on the value of the timestamp flag;

generate a first log entry header for the first log entry, the first log entry header including the timestamp flag value and the timestamp; and generate the first log entry by prepending the first log entry header to data parameters associated with the received message.

20. The system of claim 19, wherein when the elapsed time since the previous log entry is not below the threshold value, the timestamp is an absolute time for a storage device storing the first log structure, and the processing device is further configured to:
  insert a portion of the absolute time as an additional data parameter within the first log entry separate from the first log entry header.

* * * * *